Dec. 2, 1941.   W. BLACKMORE   2,264,907
JOURNAL BOX
Filed June 8, 1939   2 Sheets-Sheet 1

INVENTOR
William Blackmore
BY Albert E. Field
ATTORNEY

Dec. 2, 1941.      W. BLACKMORE      2,264,907
JOURNAL BOX
Filed June 8, 1939      2 Sheets-Sheet 2
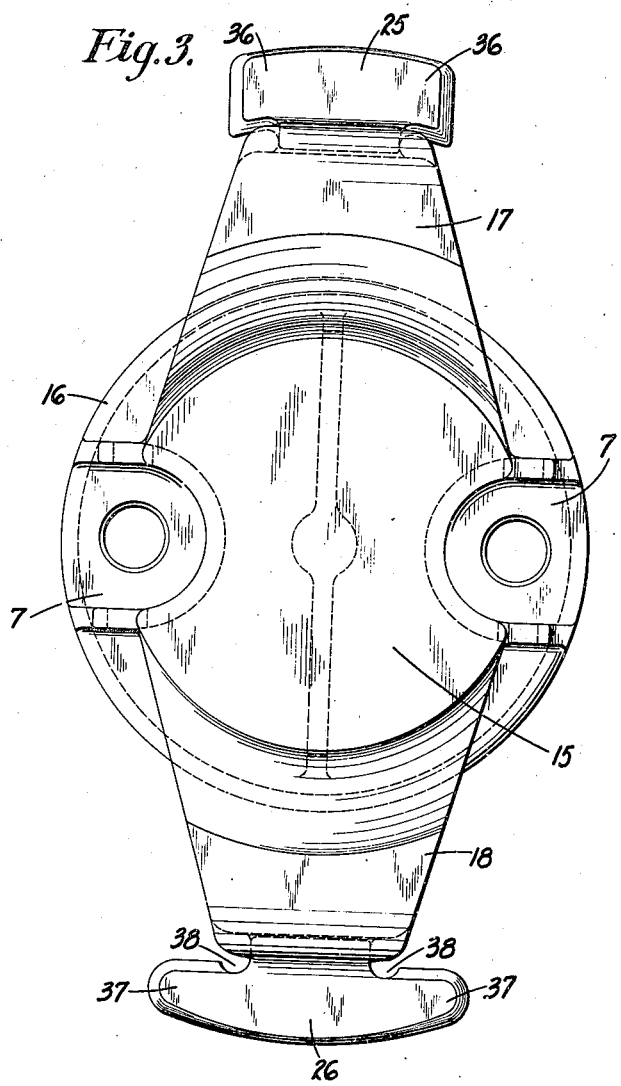
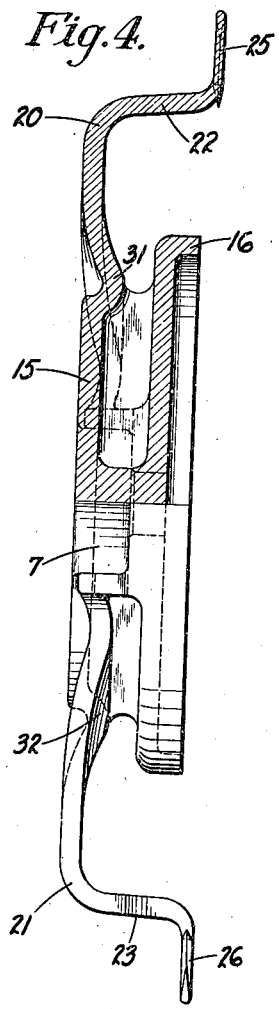
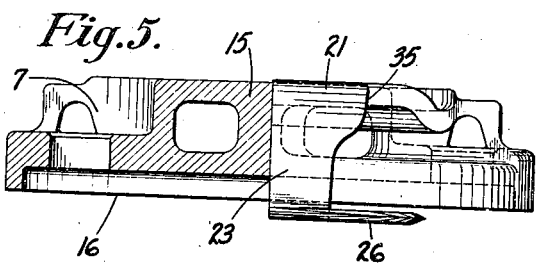
INVENTOR
William Blackmore
BY Albert E. Field
ATTORNEY Patented Dec. 2, 1941

2,264,907

UNITED STATES PATENT OFFICE 2,264,907

JOURNAL BOX

William Blackmore, Cleveland Heights, Ohio, assignor to National Malleable and Steel Castings Company, Cleveland, Ohio, a corporation of Ohio Application June 8, 1939, Serial No. 278,101

4 Claims. (Cl. 308—86)

This invention pertains to railway journal boxes and more particularly to the type provided with a free oiling system.

The principal object of the invention is the provision of an integral member for resisting end thrusts of the journal relative to the box and formed with wings for conveying oil from the reservoir in the bottom of the box to points where the oil can be distributed to the bearing surfaces. An advantage of forming both of these members integral is that fewer parts are required and the member can be more readily assembled on the end of the journal. Moreover, fewer bends in the oil conveying portions are required, in the integral member, to clear the projecting shelf on the wedge member, since the oil conveying member is positioned farther from the end of the journal.

A further object of the invention is the provision of means for securing the member to the journal and for positioning the member independently of the retaining bolts without the necessity of intricate machine operations on the journal. With my invention the member is correctly positioned on the end of the journal by means of an integral flange, so that the only machining operation necessary upon the journal end is the tapping of a pair of holes therein adapted to receive the bolts which secure the member to the journal.

In oil conveying members of the type shown which rotate on the end of the journal, vibrations are set up therein caused by passage of the car over rail joints, cross-overs and the like which impose severe stresses in the member. Since it is highly undesirable to unduly increase the weight of the thrust block and oil conveying member, because of the forces that would be imposed on the end of the journal due to the high speeds of rotation encountered, I have so constructed my combined thrust block and oil conveying member so that a reasonably long life thereof may be obtained without unduly increasing the weight of the member. I have found that it is possible to control any breakage that might occur to the wings of the oil conveying member, and that even after such a failure the wings will be in such condition that conveyance of oil thereby is substantially unaffected.

Other objects and advantages of the invention will be better understood from the following description and drawings, in which:

Figure 3 is a plan view of the combined thrust block and oil conveying member.

Figure 4 is a side view of the member shown in Fig. 3, partly in elevation and partly in vertical section; and Figure 5 is an end view of Fig. 3, half of which is shown in section.

Figure 1:
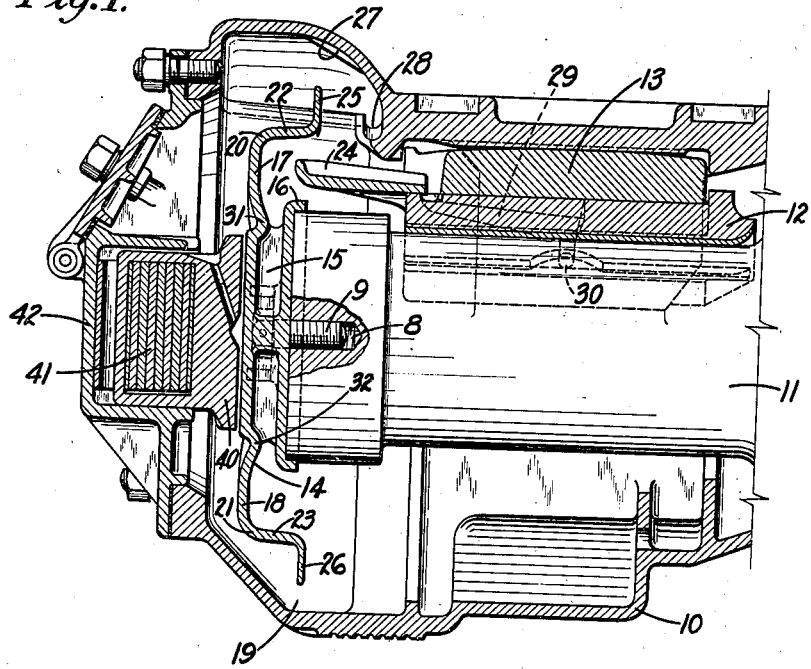
Figure 1 is a longitudinal vertical sectional view through a journal box having a thrust block and oil conveying member embodying my invention applied thereto.
Figure 2:
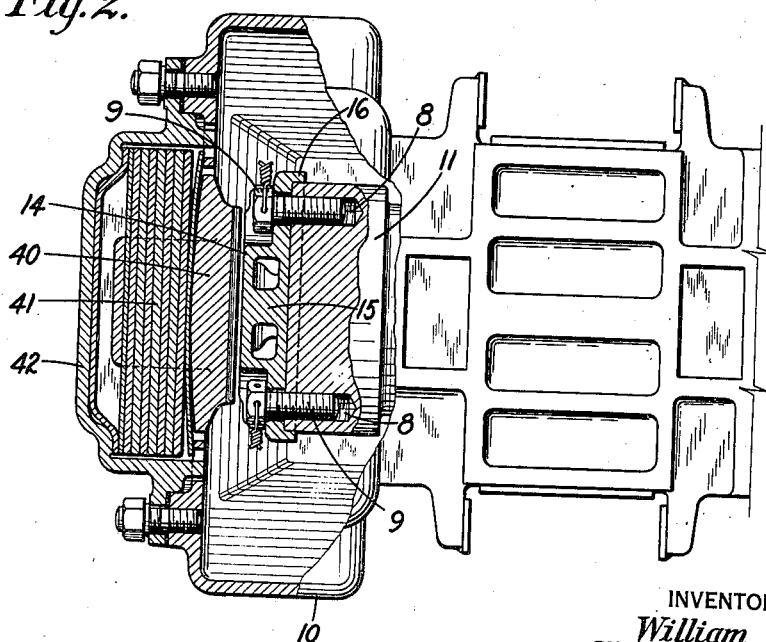
Figure 2 is a plan view of the journal box shown in Fig. 1, partly in horizontal section.

Referring to the drawings, the journal box 10 has extending into an end thereof a journal 11, and between the top of the box and the journal is a bearing member 12 and a wedge member 13. On the end of the journal 11 is mounted the combined thrust block and oil conveying member 14. This member comprises a central thrust receiving portion 15 on a rear side of which is a cylindrical flange 16 which overlaps the end of the journal to correctly position the member with respect thereto and resists transverse movement of the member relative to the journal in all directions. Member 14 is secured to the journal end by means of bolts 9, 9. The thrust portion 15 is recessed, as at 7, for the heads of the bolts. It will be observed that the only machining of the journal end required for mounting of the member is the tapping of bolt holes 8, 8. Extending radially outwardly from central portion 15 are arms 17 and 18 that are adapted to alternately enter oil reservoir 19 in the bottom of the journal box. Arms 17 and 18 are bent inwardly toward the rear of the box at 20 and 21 respectively, to form horizontal portions 22 and 23 which extend inwardly a sufficient distance to overlie a trough 24 on the wedge member 13. At the ends of portions 22 and 23, arms 17 and 18 are bent radially outwardly to form substantially vertical blades 25 and 26 that are adapted to dip into the oil in the reservoir and either drop it into trough 24 or if the speed of rotation is sufficiently high, to throw it by centrifugal force onto upper wall 27 of the journal box, where it is carried by groove 28 to a position where it may drop into trough 24. From trough 24 the oil flows through channels 29 and 30 to the bearing surfaces of the bearing member and journal.

It will be observed that arms 17 and 18, where they join central portion 15 of the member, are very wide, being almost as wide as the end portion of the journal. At the points where these arms are joined to the central portion they are curved, as at 31 and 32 respectively, to form inwardly extending circular protuberances which serve to increase the strength of the arms at their points of juncture with the central portion 15 of the member. These points of juncture are therefore relatively stiff and serve to limit vibration of arms 17 and 18. I have found it highly desirable to provide that if any breakage occurs it will be at the outer ends of arms 17 and 18, hence the edges of these arms converge from the points of juncture with central portion 15 to the first bent portions 20 and 21. As portions 22 and 23 are, due to their substantially horizontal positions, subjected to vibration about bends 20 and 21 and since it would be undesirable to have the member break at either of said points of vibration, I maintain the width of the member substantially constant in the region of bends 20 and 21, as is clearly shown at 35 at the right-hand side of Fig. 5. From about the mid point of horizontal portions 22 and 23 the side walls thereof are brought closer together so that the portions are considerably narrower where they join blades 25 and 26 than at bends 20 and 21. Blades 25 and 26 are formed with lateral projections 36 and 37 and are of less thickness than the remaining portions of arms 17 and 18. Blade 26 is recessed at 38 so as to provide sections definitely weaker than the central portion of the blade. Blades 25 and 26 are shown of different shape, although if desired they may be made the same. I have found with the present invention, that if breakage occurs it is always the lateral projections 36 or 37 that break off, thus leaving a substantial part of the blade for conveying oil. Such breakage can be readily observed upon inspection of the journal box, and a member thus indicated as being weakened by vibration can be changed before damage is done to the box through possible failure of the oil system.

In the drawings I have shown a resilient thrust block 40 opposing member 14. Thrust block 40 has a leaf spring 41 passing therethrough and mounted in the cover 42 of the journal box. Outward thrusts of the journal relative to the box are therefore resiliently cushioned. Certain of the details of this resilient thrust block are further described and claimed in my copending application Serial No. 225,972 filed August 20, 1938. Any other type of thrust receiving block may be provided, however, without departing from the spirit of my present invention.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. A combination thrust block and oil conveying member adapted for mounting on the end of a journal comprising a central portion having a thrust transmitting surface on one side and journal and seating portion on the opposite side, said seating portion having an integral cylindrical flange adapted to position the member with respect to end of the journal, and a pair of arms extending from said central portion, said arms being joined with said central portion by inwardly extending arcuate protuberances adapted to strengthen the junctures of said arms and central portion.

2. An oil conveying member adapted to be secured to an end of a journal in a railway journal box, said member having a substantially flat central portion and outwardly extending arms, said arms where they join said central portion being convexly curved toward the journal when said member is assembled therewith.

3. An oil conveying member adapted to be secured to the end of a journal, said member having radially extending arms terminating in oil conveying blades, said blades being of lesser thickness than said arms, and projections extending laterally from the extremities of said blades, said projections being joined with said blades by weaker sections of metal than the radially inward portions of said member so as to cause said projections to break before the remainder of said member when the latter is subjected to vibration.

4. An oil conveying member for a journal box having radially extending arms terminating in oil contacting blades of lesser thickness than said arms, and means for indicating the amount of fatigue in said member comprising a projection extending laterally from one of said blades and joined therewith by a weaker section of metal than radially inward portions of said member so as to cause said projection to break before the remainder of said member when the latter is subjected to vibration.

WILLIAM BLACKMORE.